Patented Apr. 11, 1944

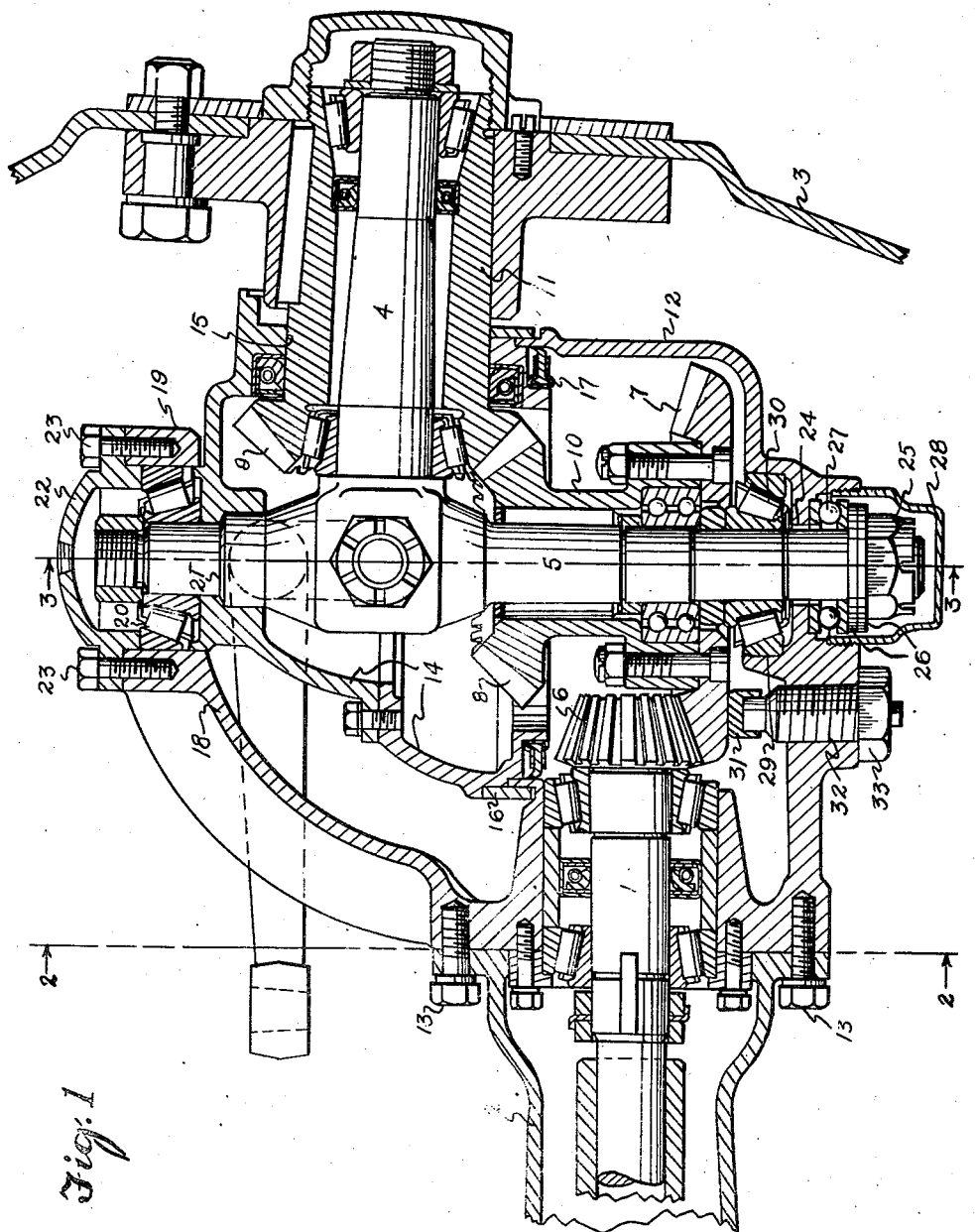

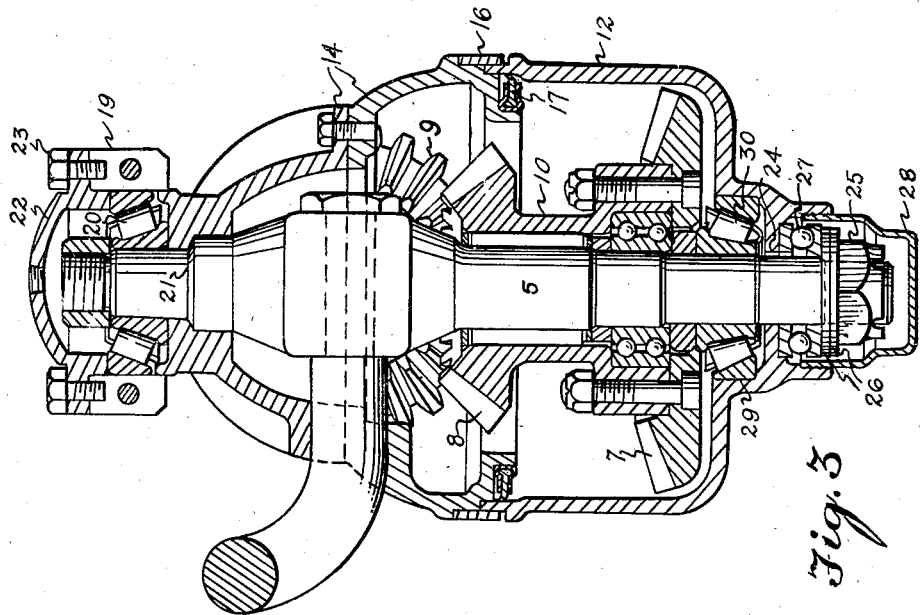
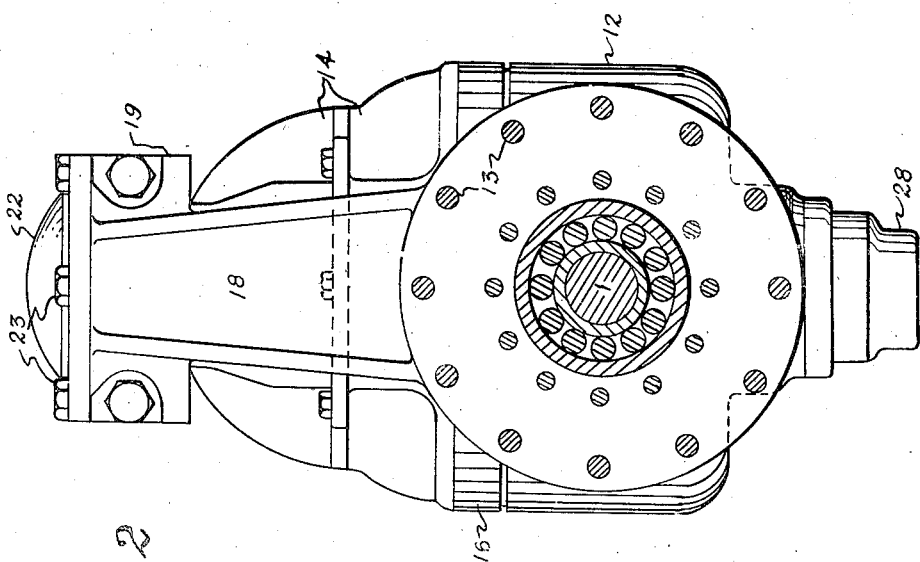

2,346,143

UNITED STATES PATENT OFFICE 2,346,143

FRONT WHEEL DRIVE MECHANISM

Frank H. Asam, Detroit, Mich.

Application May 30, 1942, Serial No. 445,155

5 Claims. (Cl. 180—43)

This invention relates to front wheel drive mechanisms for motor vehicles and has the nature of an improvement on construction shown by my United States Patent 1,852,226, issued April 5, 1932.

The patented construction aforesaid comprises a king pin having an integral spindle journaling a front wheel, said king pin supporting and being swiveled upon an end of the front axle housing. A train of bevel gears transmit a drive to said wheel from a live axle within said housing. In said construction, the axle load is transmitted to the king pin through an arm rigidly connected to and upwardly projecting from the axle housing and terminally supported upon the upper end portion of the king pin. For transmitting heavy loads to the king pin and resisting heavy stresses occasionally transmitted from wheel to axle, said arm has not proven fully adequate, it being required to design said arm unduly heavy to secure for it the required strength and rigidity.

The present object is primarily to adapted the axle load to be taken by the king pin at both ends of the latter, and to adapt the king pin to react at both ends upon the axle responsive to travel stresses delivered from the wheel, so that aforementioned arm may be largely relieved of stresses heretofore imposed on it.

A further object is to extend the king pin downwardly through the lower member of a housing for said pin and for the gear train through which the wheel is driven, while avoiding escape of lubricant occupying said lower member.

A further object is to provide an abutment engaging a gear journaled on the king pin and driven from a gear on the live axle, said abutment being adjustable to accurately maintain the proper interengagement of said gears.

These and various other objects are attained by the construction hereinafter described and illustrated in the accompanying drawings, wherein:

Fig. 1 is an axial vertical sectional view of the drive mechanism.

Fig. 2 is a cross sectional view of the mechanism taken on the line 2—2 of Fig. 1.

Fig. 3 is a cross section on line 3—3 of Fig. 1.

In these views, the reference character 1 designates a live front axle and 2 the housing of such axle. Said housing receives a vehicle load in any well-known manner (not shown) and transmits such load in part to a wheel 3 journaled on a spindle 4 integrally projecting from a king pin 5. The drive from the axle 1 to said wheel comprises a train of bevel gears 6, 7, 8 and 9, the gears 7 and 8 being fixed on a sleeve 10 journaled on the lower portion of the king pin, and the gear 9 being fixed on a hub 11 rigidly carrying the wheel. The king pin and gear train occupy a housing comprising a lower portion 12 rigidly connected as by bolts 13 to the axle housing, and an upper portion 14 swivelly mounted on said lower portion and thus adapted to participate in swivel movement of the king pin. An opening 15 in the said upper portion accommodates the hub 11, and suitable sealing rings 16 and 17 are provided at the juncture of the portions 12 and 14.

To mount the upper end of the king pin and transmit stresses to and from said end, an arm 18 is carried by the housing member 12 adjacent to the axle housing, said arm projecting upwardly in spaced relation to the housing member 14 and being curved toward the king pin, and terminating in an annulus 19 wherein is fitted an anti-friction bearing 20, journaling the upper end of the king pin. Said bearing is of a cone type such as to transmit load from the arm to the top of the housing member 14, such top seating on an annular shoulder 21 of the king pin to transmit the load to the latter. Preferably a cap 22 disposed above the king pin and bolted as indicated at 23 to the arm serves as a medium for transmitting said load, while further serving to close the opening wherein the king pin is journaled. The king pin projects downwardly through an opening 24 in the bottom of the member 12, being terminally threaded below said member to rigidly carry a nut 25. Washers 26 surmounting said nut support an anti-friction thrust bearing 27 encircling the king pin, load being transmitted from the member 12 through the bearing 27 and nut 25 to the king pin, and thus materially relieving stress imposed on the arm 18. A cap 28 in screw-threaded engagement with the member 12 projects downwardly from said member to accommodate the lower end portion of the king pin and the nut on said end, said cap preventing discharge of lubricant from said member through the opening 24. Interiorly of the member 12, the bottom thereof is formed with a depression 29 wherein is fitted an anti-friction bearing 30 journaling the lower portion of the king pin.

It is essential to accurately position the sleeve 10 lengthwise of the king pin to assure proper meshing of the gears 7 and 8 with the gears 6 and 9. This is accomplished by engaging the gear 7, beneath its point of engagement with the gear 6, by a thrust pad 31, surmounting an adjusting screw 32 threaded into the bottom of the member 12 and held in adjustment by a locknut 33 tightened against the bottom face of said member.

The transmission of load stresses to the king pin and delivery of travel stresses from wheel to axle are taken care of in a considerably safer and more satisfactory manner by employing both the upper and lower ends of the king pin to transmit such stresses, as in the improved mechanism.

What I claim is:

1. In a vehicular front wheel drive mechanism, the combination with a king pin, a spindle rigidly projecting from the king pin, and a wheel journaled on the spindle, of a live axle, gearing driving the wheel from said axle, a housing for said axle, and a mounting for the king pin rigidly and terminally carried by said housing, a provision above said gearing for seating and supporting said mounting, a seating element carried by the king pin below said gearing for seating and supporting said mounting, and an anti-friction thrust bearing interposed between said seating element and said mounting.

2. In a vehicular front wheel drive mechanism, the combination with a king pin, a spindle rigidly projecting from said king pin, and a wheel journaled on the spindle, of a live axle, gearing driving the wheel from said axle, a housing for said axle, a housing for said gearing having a portion rigidly and terminally carried by the axle housing, the king pin having an end portion projecting downwardly beyond the gear housing, a seating element carried by the downwardly projecting end of the king pin for supporting the gear housing, and an anti-friction thrust bearing interposed between said seating element and the gear housing.

3. In a vehicular front wheel drive mechanism as set forth in claim 2, a cap secured to and downwardly projecting from the gear housing and receiving the projecting lower end of the king pin and said seating element on such end.

4. In a vehicular front wheel drive mechanism, the combination with a king pin, a spindle rigidly projecting from said king pin, and a wheel journaled on said spindle, of a live axle, gearing driving the wheel from said axle, a housing for said axle, a housing for said gearing having a lower portion rigidly and terminally carried by said axle housing and an upper portion swiveled on said lower portion to turn with the king pin, the spindle being extended exteriorly of the housing through said upper portion, an arm rigidly connected at one end to the axle housing and extending from said end exteriorly of the gear housing, means for transmitting load to the upper end of the king pin from said arm, a seating element carried by the lower end portion of the king pin for supporting the gear housing, and an anti-friction thrust bearing interposed between said seating element and the gear housing.

5. In a vehicular front wheel drive mechanism, the combination with a king pin, a spindle rigidly projecting from the king pin, and a wheel journaled on said spindle, of a live axle, a bevel gear fixed on the live axle, a bevel gear fixed upon said wheel, a pair of bevel gears rigidly interconnected and journaled on the king pin, one in driving engagement with the gear fixed on the wheel and the other in driven engagement with the gear fixed on the live axle, a housing receiving said gearing, a thrust member upwardly bearing against one of said rigidly interconnected gears, and a screw threaded and upwardly adjustable in the gear housing and surmounted by said thrust member.

FRANK H. ASAM.